(12) United States Patent
Lackey, Jr. et al.

(10) Patent No.: US 6,694,397 B2
(45) Date of Patent: Feb. 17, 2004

(54) REQUEST QUEUING SYSTEM FOR A PCI BRIDGE

(75) Inventors: Stanley A. Lackey, Jr., Groton, MA (US); Sanjeev Jain, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 09/823,205

(22) Filed: Mar. 30, 2001

(65) Prior Publication Data

US 2002/0144039 A1 Oct. 3, 2002

(51) Int. Cl.[7] .............................................. G06F 13/00
(52) U.S. Cl. ..................... 710/112; 710/107; 710/306; 710/309; 710/310; 710/240; 710/241
(58) Field of Search ................................ 710/1, 36, 39, 710/52–57, 107, 112, 113, 240, 305, 306, 309, 310–315, 241; 711/100

(56) References Cited

U.S. PATENT DOCUMENTS

| | | | | |
|---|---|---|---|---|
| 5,717,876 A | * | 2/1998 | Robertson | 710/309 |
| 5,778,235 A | * | 7/1998 | Robertson | 710/240 |
| 5,835,739 A | * | 11/1998 | Bell et al. | 710/309 |
| 6,108,741 A | * | 8/2000 | MacLaren et al. | 710/314 |
| 6,170,030 B1 | * | 1/2001 | Bell | 710/310 |
| 6,205,506 B1 | * | 3/2001 | Richardson | 710/310 |
| 6,266,778 B1 | * | 7/2001 | Bell | 713/400 |
| 6,279,087 B1 | * | 8/2001 | Melo et al. | 711/146 |

* cited by examiner

Primary Examiner—Xuan M. Thai
(74) Attorney, Agent, or Firm—Blakely, Sokoloff, Taylor & Zafman, LLP

(57) ABSTRACT

A PCI and PCI-X bus-bridging method and apparatus is described. Posted memory write requests and requests not allowed to execute before a prior posted memory write are written to one queue. Requests that are allowed to pass a posted memory write are written to a separate second queue. Requests at the head of these queues receiving a RETRY response or failing to execute completely are removed from the queue and stored in a Retry List. Requests execute depending on which one of them wins control of the destination bus. The posted memory writes queue and any request not allowed to pass a posted memory write are blocked from executing if there is a location in the Retry List occupied by a posted memory write.

28 Claims, 4 Drawing Sheets

| | POSTED MEMORY WRITE COL. 1 | DELAYED READ REQUEST COL. 2 | DELAYED WRITE REQUEST COL. 3 | DELAYED READ COMPLETION COL. 4 | DELAYED WRITE COMPLETION COL. 5 |
|---|---|---|---|---|---|
| POSTED MEMORY WRITE ROW 1 | NO | YES | YES | YES | YES |
| DELAYED READ REQUEST ROW 2 | NO | YES/NO | YES/NO | YES/NO | YES/NO |
| DELAYED WRITE REQUEST ROW 3 | NO | YES/NO | YES/NO | YES/NO | YES/NO |
| DELAYED READ COMPLETION ROW 4 | NO | YES | YES | YES/NO | YES/NO |
| DELAYED WRITE COMPLETION ROW 5 | YES/NO | YES | YES | YES/NO | YES/NO |

REQUEST QUEUING SYSTEM FOR A PCI BRIDGE

FIELD OF THE INVENTION

The invention relates to bus bridges. More particularly, the invention relates to a bus bridge designed to connect a Peripheral Component Interface (PCI) bus or a PCI Extended (PCI-X) bus to another bus of any type. The PCI bus standard is found in Peripheral Component Interconnect (PCI) Local Bus Specification, Rev. 2.2, Dec. 18, 1998, available from the PCI Special Interest Group, Portland, Oreg. The PCI-X bus standard, a high-speed addendum to the PCI standard, is found in PCI-X Specification, Rev. 1.0a, Jul. 24, 2000, also available from the PCI Special Interest Group.

BACKGROUND OF THE INVENTION

To support the high-bandwidth data transfers demanded by modern applications, data are clocked across the buses of today's computer/digital systems at tremendous rates. To achieve reliable, high-speed data transfer, such systems often include a number of buses arranged in hierarchy and interconnected by devices called bus bridges.

A bus bridge is basically a load-isolating device that allows multiple devices to appear as a single capacitive load to a bus. Although the reduced capacitive loading increases the maximum frequency at which a bus can be operated, the bridge adds a layer of complexity to the design and operation of the computer/digital system. Further complexity can result if the bridge is used to interconnect different types of buses because the bridge will translate data, commands, and other control signals between the two bus formats.

The PCI to PCI Bridge Architecture Specification, Dec. 18, 1998, available from the PCI Special Interest Group, defines ordering rules for a PCI bridge. The ordering rules define the situations in which a request on the bridge may or may not pass a prior request on the bridge. These rules are necessary in order to avoid system deadlocks or the use of stale data.

Current PCI bridges rely on complex schemes that augment a set of first-in-first-out (FIFO) and/or random access structures with request numbering or other token-based schemes. Additional logic must then monitor the tokens to determine which requests may proceed and which requests must wait in accordance with the PCI Bridge ordering rules.

BRIEF DESCRIPTION OF THE DRAWINGS

The invention is illustrated by way of example, and not by way of limitation in the figures of the accompanying drawings in which like reference numerals refer to similar elements.

FIG. 3 summarizes the PCI bridge ordering requirements from Table 5-2 of Revision 1.1 of the PCI to PCI Bridge Architecture Specification.

DETAILED DESCRIPTION OF THE INVENTION

In the following description, various aspects of the present invention will be described, and various details will

2 be set forth in order to provide a thorough understanding of the present invention. However, it will be apparent to those skilled in the art that the present invention may be practiced with only some or all aspects of the present invention, and the present invention may be practiced without the specific details. In other instances, well-known features are omitted or simplified in order not to obscure the present invention.

The description will be presented using terminology commonly employed by those skilled in the art to convey the substance of their work to others skilled in the art. Various operations will be described as multiple discrete steps performed in turn in a manner that is most helpful in understanding the present invention. However, the order of description should not be construed as to imply that these operations are necessarily performed in the order they are presented, or even order dependent. Reference in the specification to "one embodiment" or "an embodiment" means that a particular feature, structure, or characteristic described in connection with the embodiment is included in at least one embodiment of the invention. Lastly, repeated usage of the phrase "in one embodiment" does not necessarily refer to the same embodiment, although it may.

Figure 1:
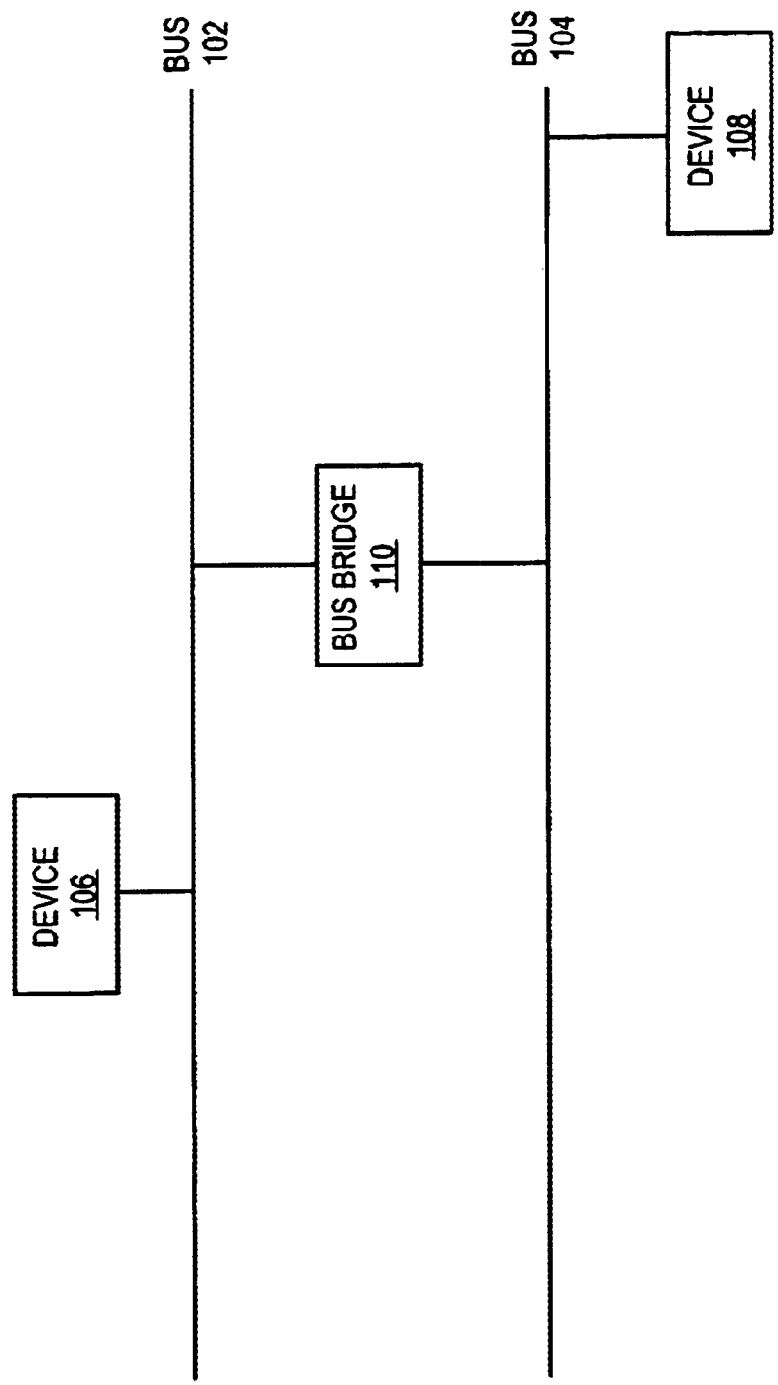
FIG. 1 is a simple representation of how an embodiment of the invention connects two devices located on separate buses.

FIG. 1 is a simple illustration of how bridge 110 enables two devices located on different buses to read and write data to and from each other. Device 106 is located on bus 102, which in this case is a PCI bus or PCI-X bus. Device 108 is connected to bus 104. Bus 104 may be another PCI or PCI-X bus, but it also may be any other bus that a PCI or PCI-X local I/O bus is commonly connected to. Device 106 on bus 102 may request data to be read from or written to device 108 on bus 104. Similarly, device 108 may request data to be read from or written to device 106. The requesting device is commonly referred to as the master and the device that is written to or read from, the target device. Similarly, the bus that a device is connected to may be referred to as the master bus in one instance and the target bus in another, depending on whether the device is a requesting device or a target device. "Source bus" and "destination bus" are synonymous terms for "master bus" and "target bus", respectively. The bridge 110 accepts requests from devices located on either bus, and arbitrates for control of the destination bus so that the requests may be completed.

Figure 2:
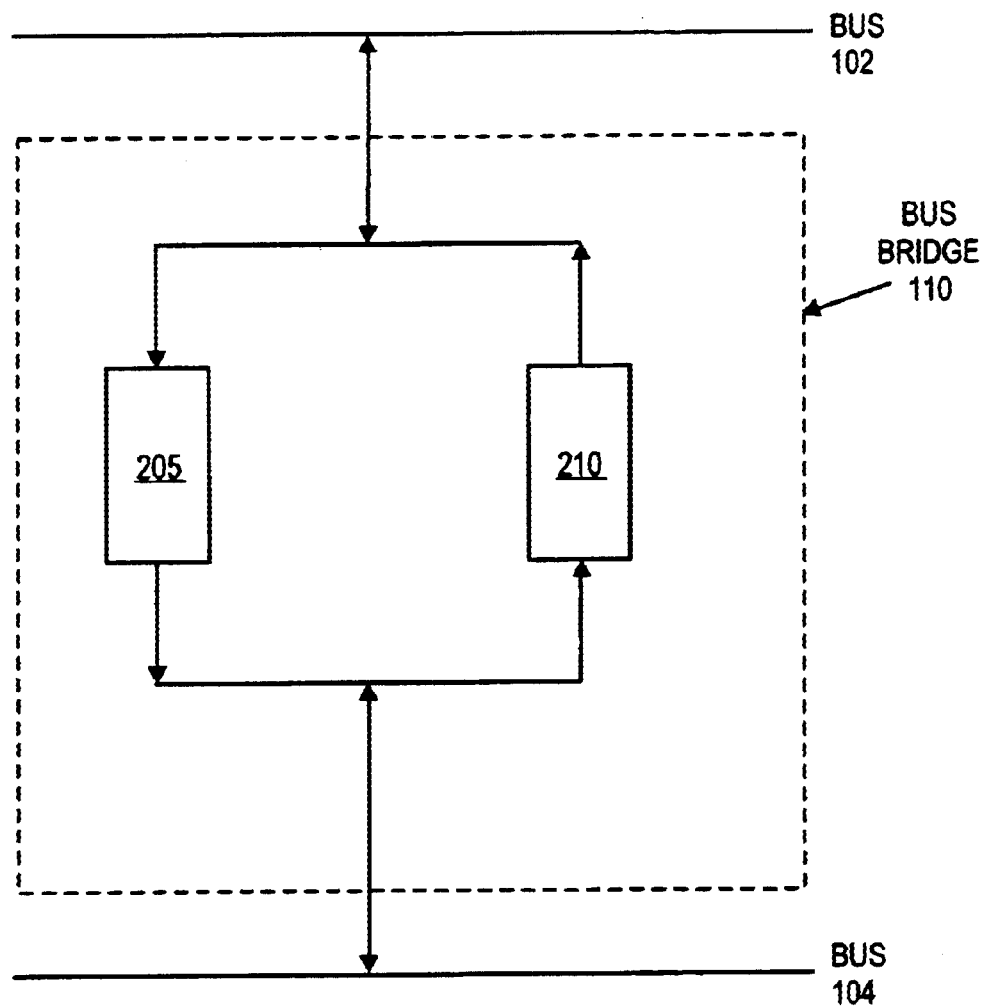
FIG. 2 illustrates the bi-directional nature of an embodiment of the invention.

As indicated above, bridge 110 may accept requests from either bus 102 or 104. FIG. 2 indicates that bridge 110 is composed of two structures, 205 and 210, to accommodate two-way request flow. One structure is set up to receive requests from source bus 102 when a device on that bus is reading from or writing to a device on destination bus 104. The other structure is set up to process requests from bus 104 when it is writing or reading data from a device on bus 102. The logic to accomplish this is generally the same in both cases, therefore structure 205 and structure 210 can be identical, but are aligned in opposite directions with respect to busses 102 and 104. The present invention will henceforth be described in the context of requests flowing from bus 102 to bus 104. A duplicate structure is used to accommodate requests flowing from bus 104 to bus 102.

The PCI Local Bus Specification, Rev. 2.2, contains a set of general ordering requirements for all requests, along with a set of requirements that are specific to delayed requests. These ordering requirements are summarized in Table 5-2 of the PCI to PCI Bridge Architecture Specification, Rev. 1.1. The contents of this table are reproduced in FIG. 3 for convenience. Each column of the table in FIG. 3 represents a request that was accepted by the bridge at some earlier time, while each row represents a request that was just accepted. The contents of the box indicate what ordering relationship the second request must have to the first. A "yes" indicates that the second request must be permitted to execute before the first request, in the case that the first request cannot execute for any reason, to avoid deadlocks. Conversely, a "no" indicates that the second request must not execute before the first in order to avoid stale data. A "yes/no" response indicates that there is no ordering relationship that must exist between the two, but any choice made may still effect the system cost and speed. For purposes of this application there is no need to explain the rationale behind each ordering requirement in FIG. 3, a complete explanation may be found in the PCI to PCI Bridge Architecture Specification, Rev. 1.1.

The five different requests seen in FIG. 3 deserve a quick explanation. A posted memory write (FIG. 3, col. 1), or PMW, is a request that has completed on the source bus before completing on the destination bus. A delayed read request (FIG. 3, col 2), or DRR, is a request that must complete on the destination bus before completing on the source bus. A delayed write request (FIG. 3, col 3), or DWR, is also a request that must complete on the destination bus before completing on the source bus. A delayed read completion (FIG. 3, col 4), or DRC, is a request that has completed on the destination bus and is now moving toward the source bus to complete. Similarly, a delayed write completion (FIG. 3, col 5) or DWC, is a request that has completed on the destination bus and is now moving toward the source bus.

The ordering rules for a PCI-X bus bridge are substantially the same but the DRR, DWR, DRC, and DWC requests of the PCI mode are replaced by the split read request (SRR), split write request (SWR), split read completion (SRC), and split write completion (SWC).

In PCI mode, a PMW is allowed to pass any prior request except for a prior PMW (FIG. 3, row 1, cols 1–5) and no request may pass a prior PMW except for a DWC (FIG. 3, row 5, col 1). PCI-X mode is similar in that a SWC request may pass a PMW. In either PCI or PCI-X, there is a special operational mode where read requests are allowed to pass write requests, known as "read pass write" mode. All embodiments of the present invention capitalize on the fact that regardless of what mode the bus is in, PCI or PCI-X, some requests may pass a PMW and some may not.

Figure 4:
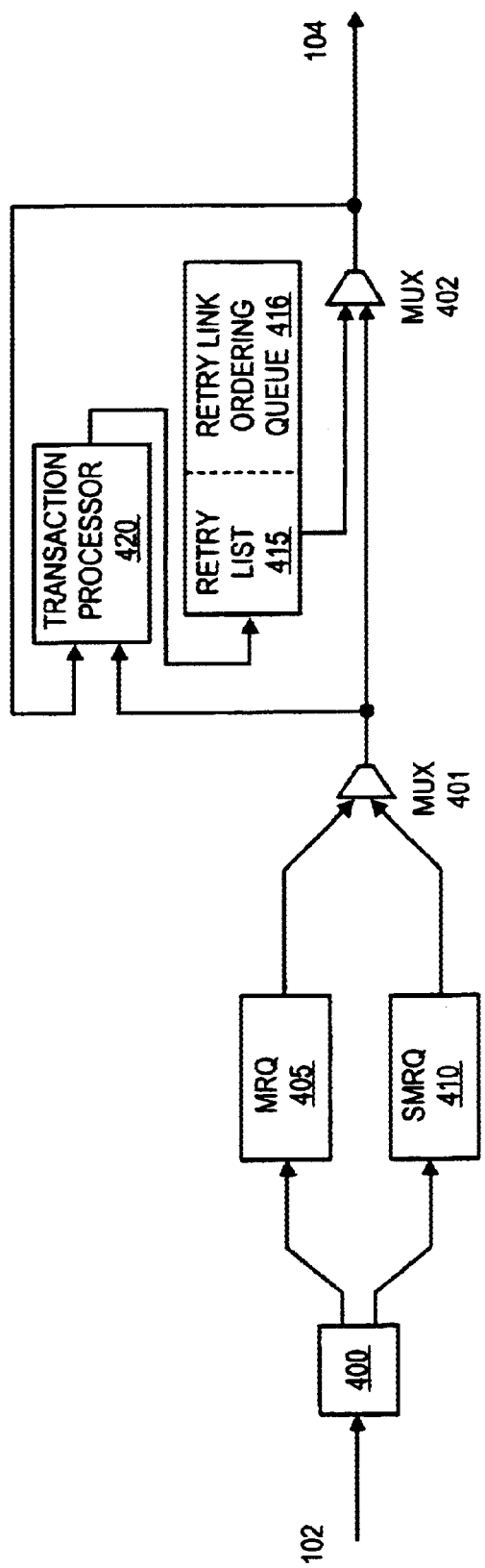
FIG. 4 is a detailed illustration of an embodiment of the invention.

FIG. 4 is a diagram of an embodiment of the present invention. The embodiment is intended to meet the ordering requirements of a PCI to PCI Bridge that were discussed above in FIG. 3, and to do so without using complicated token-based or numbering schemes employed by the prior art.

Incoming requests are received from source bus 102. At 400, all posted memory writes or any request that is not allowed to pass a posted memory write is placed in the main request queue (MRQ) 405. Any request that is allowed to pass a posted memory write (such as a delayed write completion in PCI mode or a split write completion in PCI-X mode) is placed in the special mode request queue (SMRQ) 410. In one embodiment, MRQ 405 and SMRQ 410 are First-In-First-Out (FIFO) queues, each having eight entries, where requests are written to the tail of the queue in the source bus's clock domain and read from the head in the destination bus's clock domain. In addition, 400 contains other hardware structures and logic designed to aid in the processing of Delayed transactions (PCI mode) and Split transactions (PCI-X mode), along with a Request Recoder that converts addresses from either mode into a common internal format that can support both methods of operation. However, a description of those additional structures is not needed for purposes of this application.

The Retry List 415 stores all requests that received RETRY responses or were Disconnected partway through the transaction so that they can be retried or continued later. In one embodiment, Retry List 415 provides storage for up to eight non-PMWs and has one dedicated location for a PMW. Retry List 415 also stores Split Completion requests (PCI-X mode) that need to be delayed due to ordering constraints, relative to other Split Completion requests which may already be in the Retry List. Retry List 415 is read/written in the destination bus's clock domain. Multiplexor (MUX) 401 and MUX 402 are used to route the proper request from MRQ 405, SMRQ 410, or Retry List 415 to destination bus 104.

Any transaction may be Disconnected prior to its completion, and thus any or all pended transactions may be in various stages of partial completion. Further, as transactions are continued, request states such as Address and Byte Count need to be incrementally advanced at each Disconnect. The Transaction Processor 420 contains the adders and subtracters needed for performing these incremental updates to the current Address and Byte Count. Transaction Processor 420 does not contain significant storage because the Retry List 415 provides storage for transactions that received a RETRY response or are partially complete. It also runs entirely on the destination bus's clock. The inputs to Transaction Processor 420 are the fields from the currently selected transaction, whether from MRQ 405, SMRQ 410, or Retry List 415. The outputs of Transaction Processor 420 include the Address (incremented), Byte Count (decremented), and any other modifications to the request's state. The output of Transaction Processor 420 is the input of Retry List 415.

Requests are pushed onto the tail of MRQ 405 and SMRQ 410 as they are received from source bus 102 and passed through the additional hardware structures and logic represented by 400. All requests from the MRQ and SMRQ are examined at the head of the queue, and the requests further down in the queue percolate upwards as requests at the head of the queues are popped off the head after being completed or removed to the Retry List 415. Control of the destination bus is arbitrated for from among MRQ 405, SMRQ 410, and Retry List 415. The winner gains destination bus control.

If MRQ 405 wins bus control, the selected request is at the head of the queue. If the request receives a RETRY response, it is popped from the head of the MRQ and moved to the Retry List. If the request does not receive a RETRY response, it executes. If the request is completed it is popped off the head of the MRQ. If the request is Disconnected partway through the transaction it will be popped off the head of the MRQ and placed on the Retry List.

If SMRQ 410 wins bus control, the selected request is likewise at the head of the queue. If the request receives a RETRY response, it is popped from the head of the SMRQ and moved to the Retry List. If the request does not receive a RETRY response, it executes. If the request is completed it is popped off the head of the SMRQ. If the request is Disconnected partway through the transaction it is popped off the head of the SMRQ and placed on the Retry List.

If Retry List 415 wins bus control, further arbitration selects a request from among those present in the Retry List. This arbitration is performed by Retry List Ordering Queue 416, which enforces any ordering requirements among the Split Completion requests located within the Retry List. In addition to performing fair arbitration between the entries on the Retry List, Retry List Ordering Queue 416 manages Retry List 415 by keeping track of which slots in the Retry List are unoccupied and occupied based upon request completion and assigning incoming requests to empty slots. If the selected request in the Retry List receives a RETRY response, it remains on the Retry List to be tried again or completed later. If the selected request is completed it is removed from the Retry List. If the request origination bus is PCI it is a Memory Read request, and the request is Disconnected partway through the transaction the request is dropped from the Retry List. If the request was Disconnected with an error, an appropriate error message is sent to target state machine. However, if the request is a Write or the origination bus is PCI-X and the request is Disconnected partway through the transaction, the request is put back into the Retry List after modifying starting address, byte count and other attributes. If the request was Disconnected with an error, an appropriate error message is sent to the master state machine. The target or master state machine on the request origination bus communicates this error back to the master of the request according to the protocol of the bus.

There are a few simple rules that are implemented among the MRQ, SMRQ, and Retry List in order to fulfill the PCI bridge ordering requirements for all embodiments of the invention. First, when a PMW reaches the head of MRQ 405, the PMW blocks the rest of the queue until the request executes. In other words, all other requests on the MRQ are prevented from executing until the PMW at the head of the MRQ has executed. Requests at the head of SMRQ 410, however, may execute independently of the status of any queued PMW in the MRQ.

Furthermore, if a PMW occupies a location within Retry List 415, MRQ 405 is prohibited from arbitrating for destination bus control until the PMW is removed from the Retry List. This rule prevents non-PMW requests in the MRQ from entering the Retry List when an earlier PMW is already present. Therefore any non-PMW request in the Retry List that is executed before the existing PMW is either a request from the SMRQ that may pass the existing PMW or a request from the MRQ that originated earlier than the existing PMW. Conversely, if the PMW present in the Retry List is executed first there is no ordering rule violation because a PMW may pass any other prior request except another PMW. There is no danger of that occurring because only one PMW may exist in the Retry List at a time. This method of ordering requests can be applied to any situation where an interface with a PCI or PCI-X bus is required.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A bus bridging method comprising:
    writing posted memory writes and any request that is not allowed to execute before a prior posted memory write, if any, to the tail of a main request queue (MRQ);
    writing a request that is allowed to execute before a prior posted memory write, if any, to the tail of a special mode request queue (SMRQ);
    arbitrating for destination bus control between said MRQ, said SMRQ, and a Retry List that stores requests from said MRQ and said SMRQ; and
    managing said Retry List with a Retry List Ordering Queue.

2. The method of claim 1, wherein the MRQ wins destination bus control as a result of said arbitration.

3. The method of claim 2, wherein the request located at the head of the MRQ receives a RETRY response and is popped from the head of the MRQ and written to an empty location in the Retry List.

4. The method of claim 2, wherein the request located at the head of the MRQ is executed.

5. The method of claim 4, wherein the request is popped off the head of the MRQ and moved to an empty location on the Retry List if the request is disconnected and does not execute completely.

6. The method of claim 4, wherein the request is popped off the head of the MRQ after it is executed completely.

7. The method of claim 1, wherein the SMRQ wins destination bus control as a result of said arbitration.

8. The method of claim 7, wherein the request located at the head of the SMRQ receives a RETRY response and is popped from the head of the SMRQ and written to an empty location in the Retry List.

9. The method of claim 7, wherein the request located at the head of the SMRQ is executed.

10. The method of claim 9, wherein the request is popped off the head of the SMRQ and moved to an empty location on the Retry List if the request is disconnected and does not execute completely.

11. The method of claim 9, wherein the request is popped off the head of the SMRQ after it is executed completely.

12. The method of claim 1, wherein the Retry List wins destination bus control as a result of said arbitration.

13. The method of claim 12, wherein one request within the Retry List is selected.

14. The method of claim 13, wherein the selected request receives a RETRY response and remains in the Retry List.

15. The method of claim 13, wherein the selected request executes.

16. The method of claim 15, wherein the selected request is removed from the Retry List or updated with the new address and byte count, in accordance with a request origination bus, when the request is disconnected and does not execute completely.

17. The method of claim 16, wherein an error message is sent to a master of the request in accordance with a protocol of the request origination bus, when the request is disconnected and does not execute completely and has been removed from the Retry List.

18. The method of claim 15, wherein the selected request is removed from the Retry List when the selected request executes completely.

19. The method of claim 1, wherein the MRQ is prevented from arbitrating for bus control if a location within the Retry List is occupied by a posted memory write.

20. The method of claim 1, wherein managing the Retry List comprises:
    performing fair arbitration between entries in the Retry List when the Retry List wins destination bus control;
    enforcing ordering requirements between entries in the Retry List;
    keeping track of what slots within the Retry List are unoccupied;
    assigning incoming requests to the Retry List to unoccupied slots; and
    marking slots within the Retry List as unoccupied when a request is completed.

21. The method of claim 1, wherein managing the currently selected request's state information comprises:

incrementally updating the Address field of the currently selected request; and incrementally updating the Byte Count field of the currently selected request.

22. A bus bridging apparatus comprising:

a Main Request Queue (MRQ) containing a plurality of entries wherein said MRQ is written at its tail in the source bus's clock domain and read at its head in the destination bus's clock domain;

a Special Mode Request Queue (SMRQ) containing a plurality of entries wherein said SMRQ is written at its tail in the source bus's clock domain and read at its head in the destination bus's clock domain;

a Retry List containing a plurality of entries for non-posted memory writes and one entry for a posted memory write, wherein said Retry List is read and written in the destination bus's clock domain;

a Retry List Ordering Queue wherein said Retry List Ordering Queue is read and written in the destination bus's clock domain;

a Transaction Processor wherein said Transaction Processor runs entirely on the destination bus's clock; and two multiplexors.

23. The apparatus of claim 22 wherein the input of said MRQ is connected to a source bus by preliminary processing logic;

the input of said SMRQ is connected to said source bus by said preliminary processing logic;

the output of said MRQ and SMRQ forms the input of the first of said two multiplexors;

the output of said first multiplexor forms one of two inputs for second of said two multiplexors and one of two inputs for said Transaction Processor;

the output of said second multiplexor is connected to the destination bus and forms one of two inputs for said Transaction Processor;

the output of said Transaction Processor forms the input of said Retry List; and the output of said Retry List forms one of two inputs for said second multiplexor.

24. The apparatus of claim 22 wherein said Retry List Ordering Queue operates in conjunction with said Retry List to manage said Retry List.

25. The apparatus of claim 22 wherein said Transaction Processor contains adders, subtracters, and multiplexors needed to incrementally update the currently selected request's state information.

26. An apparatus comprising:

a machine-accessible medium having stored thereon sequences of instructions that, when executed, cause one or more electronic systems to:

write all posted memory writes and any request that is not allowed to execute before a prior posted memory write to the tail of a main request queue (MRQ);

write any request that is allowed to execute before a prior posted memory write to the tail of a special mode request queue (SMRQ);

arbitrate for destination bus control between said MRQ, said SMRQ, and a Retry List that stores requests from said MRQ and said SMRQ;

manage said Retry List with a Retry List Ordering Queue; and manage the currently selected request's state information with a Transaction Processor.

27. The apparatus of claim 26, wherein managing the Retry List comprises:

performing fair arbitration between entries in the Retry List when the Retry List wins destination bus control;

enforcing ordering requirements between Split Completion entries in the Retry List;

keeping track of what slots within the Retry List are unoccupied;

assigning incoming requests to the Retry List to unoccupied slots; and marking slots within the Retry List as unoccupied when a request is completed.

28. The apparatus of claim 26, wherein managing the currently selected request's state information comprises:

incrementally updating the Address field of the currently selected request; and incrementally updating the Byte Count field of the currently selected request.

* * * * *